United States Patent [19]

Flora

[11] Patent Number: 4,694,344
[45] Date of Patent: Sep. 15, 1987

[54] DIGITAL EFFECTS LOOP FOR VIDEO SWITCHERS

[75] Inventor: Jay L. Flora, Boulder, Colo.

[73] Assignee: Ampex Corporation, Redwood City, Calif.

[21] Appl. No.: 845,902

[22] Filed: Mar. 28, 1986

[51] Int. Cl.[4] ............................................. H04N 5/265
[52] U.S. Cl. ....................................... 358/183; 358/22
[58] Field of Search ................. 358/183, 22, 181, 160, 358/21 R

[56] References Cited

U.S. PATENT DOCUMENTS

| | | | |
|---|---|---|---|
| 4,392,156 | 7/1983 | Duca | 358/183 |
| 4,463,372 | 7/1984 | Bennett | 358/22 |
| 4,472,732 | 9/1984 | Bennett | 358/22 |

OTHER PUBLICATIONS

Theory and Operation, Ampex Corporation Service Manual No. 1809633, Sep. 1984, pp. 3.1–3.10, 3.25–3.40 and 3.47–3.50.

Primary Examiner—Tommy P. Chin
Attorney, Agent, or Firm—George B. Almeida; Joel D. Talcott

[57] ABSTRACT

A digital effects loop is inserted in the video and key signal buses which extend to a mixer of a switcher apparatus, and a digital effects unit is coupled to the loop. Circuitry is included in the loop to interrupt the particular bus or buses and the signal or signals are re-routed to provide inputs to the digital effects unit. The latter supplies transformed video and/or key signals back to the continuation of the respective interrupted bus or buses, and then to the mixer to be used thereby in place of the original signals.

27 Claims, 3 Drawing Figures

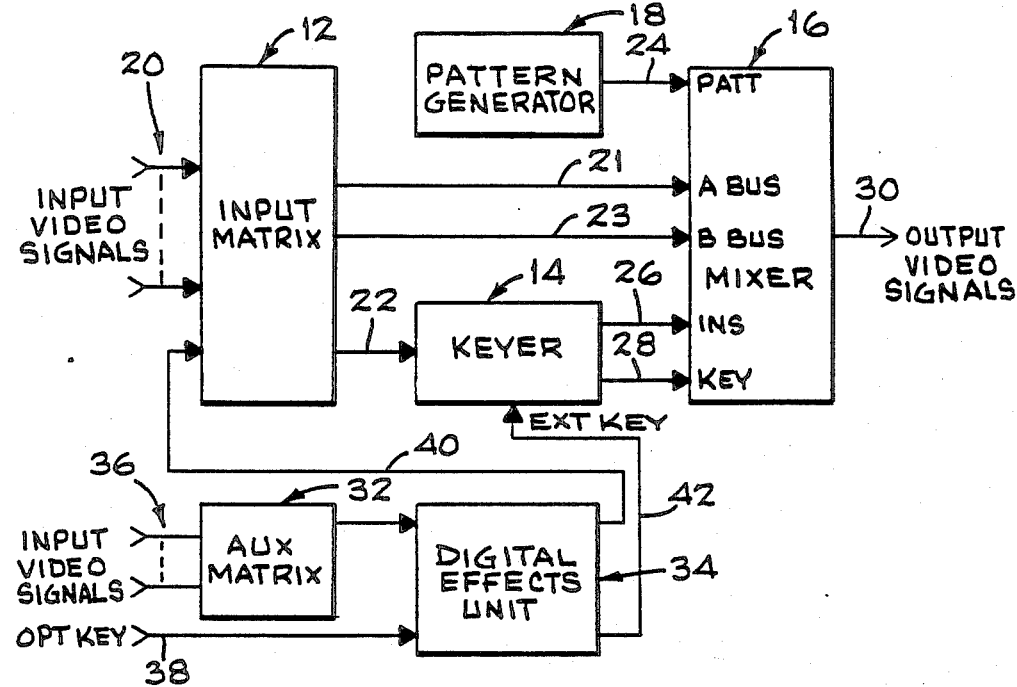
FIG_1 (PRIOR ART)
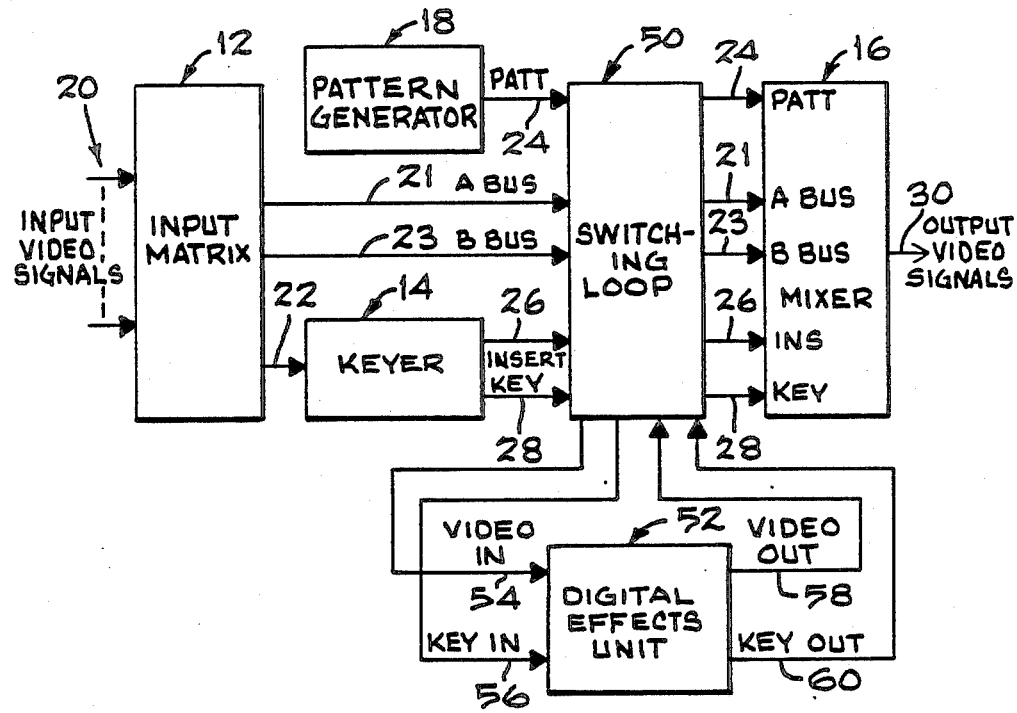
FIG_2

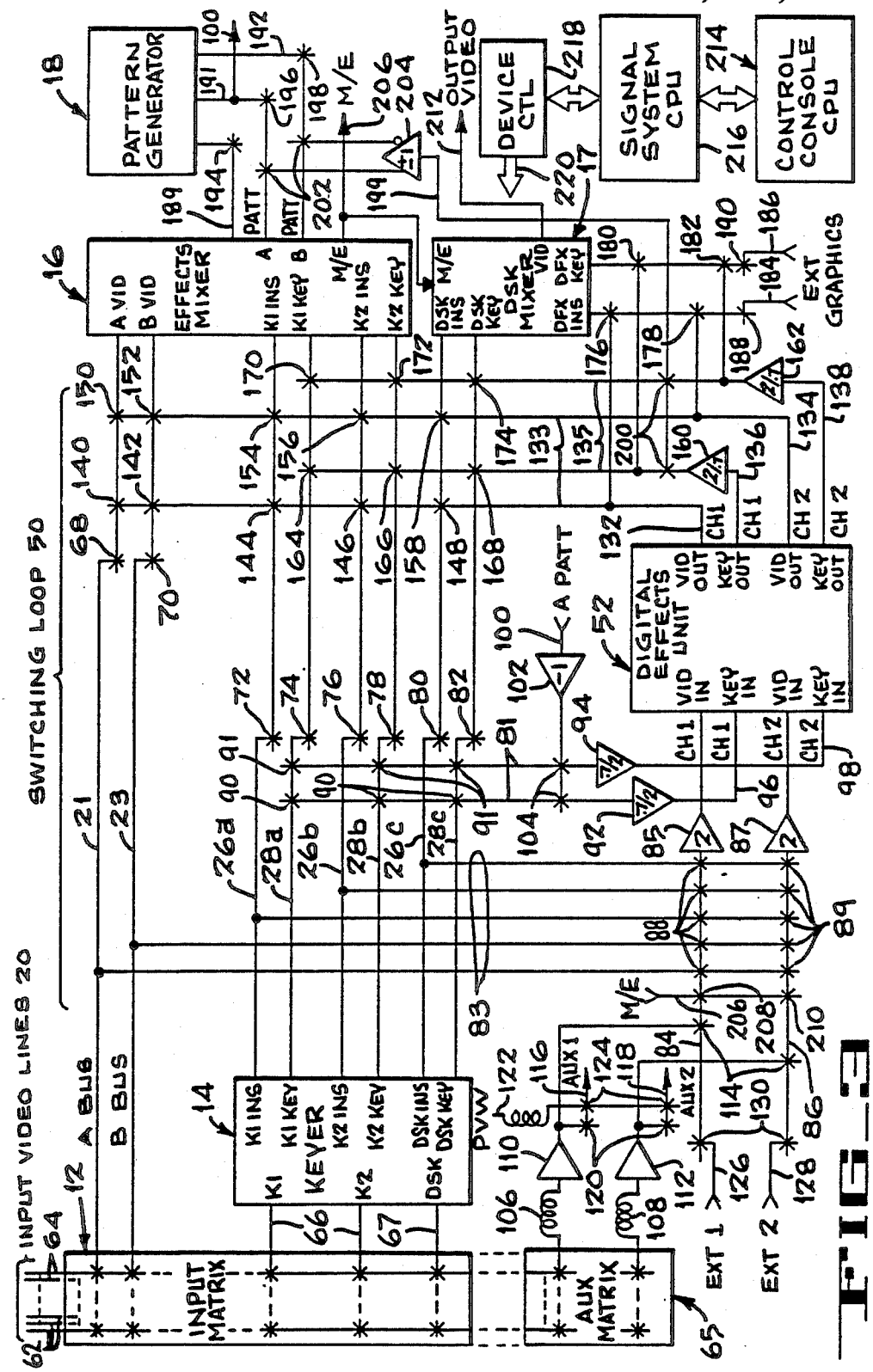

DIGITAL EFFECTS LOOP FOR VIDEO SWITCHERS

CROSS REFERENCE TO RELATED APPLICATIONS

A Digital Effects Device Integrally Combined Within A Video Switcher, U.S. Ser. No. 845,901, (AV-3351), filed Mar. 28, 1986, to Jay L. Flora.

BACKGROUND AND SUMMARY OF THE INVENTION

The invention relates to video switchers and video digital effects apparatus, and particularly to a digital video effects unit integrally inserted within various internal paths of a video switcher apparatus.

Within the past few years, the use of digital effects to manipulate video signals has increased dramatically in the field of television, and has resulted in a myriad of special effects which, in turn, are of particular interest to television broadcasting facilities and video post production studios. Since switchers have long been used for generating analog effects and otherwise manipulating video signals, it follows that the desirability for supplying digital special effects via a video switcher also has increased dramatically.

In response to this need, digital effects interfaces have been developed which allow coupling a digital effects unit to a video switcher to supply various digital special effects via the switcher. However, such digital effects/video switcher interfaces presently available have limited capabilities. To illustrate, video switcher architectures require a switching matrix for supplying video source signals to a multichannel effects processor (mixer) and key source signals to a key processor (keyer) circuitry. The keyer output then is fed to the mixer, which combines the various video source signals using the key hole cutting signals supplied by the keyer, as well as bus transition boundary signals provided by a pattern generating circuit. As part of the interface, the digital effects unit is fed from auxiliary buses, and the outputs therefrom are supplied as input video and external key sources to the switcher. These signals then are combined by the switcher in conventional fashion with keying done on the output of the digital effects unit.

As may be seen, digital effects interfaces thus are merely a patchwork solution to an existing problem, and one which fails to take advantage of the potential value of integrally combining the preferred features of the two systems. For example, a digital effects device is not a video source such as, for example, video cameras, video tape recorders, test pattern generators, character generators, etc., which normally comprise the video sources which supply a video switcher via its main input matrix. Yet, in the patchwork interface solution, the digital effects device is employed as a video source whose manipulated video output is supplied to the switcher main input matrix. This is an inefficient configuration.

Other video signal handling apparatus include, for example, a video digital effects system having a video input switching device for supplying video and key signals to a signal transforming unit. The resulting transformed signals are supplied to an adder to be combined into a video signal which has been compressed, expanded, rotated or otherwise moved about a television raster. Although such a digital effects system is capable of extensive video signal manipulation, it does not provide the functions of a switcher apparatus. Furthermore, in practical video broadcast facilities and post production studios, the transformed signals generated by such a digital effects system thereafter generally are supplied to a switcher apparatus for further manipulation such as, for example, signal mixing. Since the digital effects unit also provides a signal mixing process, the patchwork interface solution repeates the process twice needlessly.

Accordingly, it would be highly desirable to combine a digital effects unit as an integral part of a video switcher, whereby features of one system are integrally shared and utilized by the other system to provide a relatively powerful switcher apparatus. That is, it would be preferable to use a digital effects unit as a video manipulating device much in the manner of a keyer or a mixer within the switcher, rather than as a video source.

To this end, in accordance with the invention, the switcher internal paths corresponding to the video source signals and the control signals extending to the mixer, are interrupted, and a digital effects unit is, in effect, inserted in the paths. Such an integral configuration provides switcher operation enhanced by the digital effects unit to provide special effects heretofore unavailable, or available only by patching components together, when using the digital effects interface of previous mention. In the present invention, an operator may perform switcher transitions and effects via conventional switcher control inputs, with the digital effects appearing as additions to the switcher operations. Signal sources for the digital effects unit now effectively are provided internally by the switcher, and the digital effects unit outputs are reinserted directly back into the switcher as video source and control signals for the mixer within the switcher. As a result, the digital effects unit is invisible to an operator; that is, the digital effects generated appear as modifications to the basic switcher functions of digital wipes, key processing, external key inputs, analog pattern key hole cutting, etc.

Preferably, the source video and key signal paths, or buses, from the input matrix, keyer and pattern generator, which extend to the mixer within the switcher, are made interruptible via respective cross-points and connecting lines arranged to re-route the paths, thereby defining an internally "inserted" digital effects, or switching, loop means. Selectively manipulating a selected crosspoint, or crosspoints, allows the corresponding switcher signals to be redirected to dedicated digital effects input buses coupled to the digital effects unit. The resulting digital effects signals, such as transformed video and key signals, then are supplied via dedicated digital effects output buses back to the continuation of the interrupted paths, to thus provide the inputs to the mixer. The various crosspoints, the connecting lines and the dedicated input and ouput digital effects buses together define the internally combined digital effects loop within the switcher apparatus. The paths through the digital effects unit have a delay of two fields, but will look like zero time to the switcher. Thus the digital effects unit is used as a switcher internal signal manipulating device, not as an input video or external key source as in the present patchwork interface configurations. As a result, the switcher may efficiently supply digital effects which appear as additions to conventional switcher transition and effect operations, without requiring additional input from an operator.

As may be seen, the invention contemplates use with a digital video switcher as well as with the analog video switcher described herein by way of example only.

BRIEF DESCRIPTION OF THE DRAWINGS

FIG. 1 is a block diagram of a digital effects unit and a video switcher interfaced together in a configuration typically employed in the art.

FIG. 2 is a block diagram of an embodiment of the invention combination employing a digital effects unit internally inserted in a video switcher.

FIG. 3 is a combined block and schematic diagram of the block diagram of FIG. 2.

DESCRIPTION OF THE PREFERRED EMBODIMENTS

FIG. 1 illustrates a typical prior art digital effects apparatus and video switcher apparatus interfaced together, wherein the switcher apparatus includes a video input matrix 12, a keyer 14, a mixer 16 and a pattern generator 18. A plurality of video input signals are supplied by selected video sources to the input matrix 12 via input lines 20, wherein the sources may include video cameras, videotape recorders, character generators, etc. The input matrix is coupled to the mixer 16 via a source A bus 21 and a source B bus 23, as well as to the keyer 14 via at least one key bus 22. The pattern generator 18 is coupled to the pattern input of the mixer 16 via a pattern bus 24, and the keyer 14 supplies and key signals to the respective inputs of the mixer 16 via insert and key buses 26, 28. The mixer supplies the switcher video output on an output terminal 30.

The digital effects apparatus employs an auxiliary video matrix 32 of the switcher, which is coupled to a digital effects unit 34 such as, for example, an Ampex Digital Optics System, manufactured by Ampex Corporation, Redwood City, California. One or more video input signals are supplied to the auxiliary matrix 32 via multiple lines 36 by a video source or sources. An optional key signal may be coupled to the digital effects unit 34 via a line 38. The digital effects unit 34 supplies a transformed digital effects video signal to the input matrix 12 via a bus 40, and an external key signal to the keyer 14 via an external bus 42.

Accordingly, it may be seen that the above switcher/digital effects apparatus comprise essentially an interfacing of the output of the digital effects unit 34 with the main input of the switcher apparatus, utilizing an auxiliary video matrix 32 at the input of the digital effects device. The digital effects unit 34 outputs are applied as input video and external key sources to the main input matrix of the switcher apparatus. These signals are utilized by the switcher in the conventional fashion, with keying done on the output of the digital effects unit as depicted in FIG. 1. It follows that whenever digital effects signals are fed to the switcher, an auxiliary bus therein must be dedicated to accommodate the signals, thus tying up the auxiliary bus. This in turn restricts the capabilities of the switcher.

In FIG. 2 a digital effects unit is "inserted" within the internal paths of a switcher apparatus to utilize fully the advantageous features of each apparatus while further optimizing additional advantages inherent in integrally combining the apparatuses. In the FIGURES, similar components are similarly numbered. Accordingly, a switcher apparatus includes the video signal input lines 20 coupled to the input matrix 12, with the key bus 22 coupled thence to the keyer 14. The video source, the insert video, the key and the pattern buses extending to the mixer 16 from the input matrix 12, the keyer 14 and the pattern generator 18 are indicated via numerals 21, 23, 26, 28 and 24 respectively, as in FIG. 1. However, as shown in FIG. 2 and as contemplated by the invention, the paths defined as the buses 21, 23, 26, 28 and 24 are interrupted, and a switching or digital effects "loop" 50 is inserted therein prior to the mixer 16. The switching loop 50 (as hereinafter termed) supplies outputs corresponding to the continuations of the respective paths and are identified herein via the same numerals 21, 23, 26, 28 and 24.

A digital effects unit 52 corresponding, for example, to the unit 34 of FIG. 1, is modified to include digital effects video and key input buses 54, 56, which are dedicated to the digital effects unit 52 and which form part of the switching loop 50. The digital effects unit 52 is supplied with at least one video input source signal and, in some effects also with at least a corresponding input key signal, by virtue of the switching loop 50. In turn, the unit 52 is further modified to include digital effects video and key output buses 58, 60 which are dedicated thereto and which also form part of the switching loop 50. The digital effects unit 52 provides at least one digital effects output video signal and one output key signal back to the interrupted buses via the switching loop 50, which includes the dedicated video and key output buses 58, 60, respectively. Interrupting the internal paths of the source and control signals fed to the mixer 16, including the pattern generator bus 24 to the mixer, and effectively inserting the digital effects unit 52, allows enhancing the switcher operation to include performing the added digital effects of previous mention, which effects appear on the video output terminal 30. Source signals for the digital effects unit 52 now are internally provided from within the switcher, and the digital effects signals from the unit 52 are directly re-inserted as source and control signals for the mixer 16. Thus by virtue of the internally combined switching loop 50, the digital effects unit 52 appears as an integral part of the switcher apparatus, whereby switcher transitions and effects are performed in conventional fashion, with the digital special effects appearing as additions to these operations. The switching or digital effects loop may be used in the internal configuration since the path through the digital effects unit 52, although temporarily delayed, appears as a zero time delay to the switcher apparatus.

FIG. 3 includes further details of the interrupted paths within the switcher and the insertion of the digital effects unit 52 via the switching loop 50. Similar components are similarly numbered in the FIGURES. Thus, input matrix 12 is supplied with a plurality of video and key signals from corresponding video sources on the input lines 20. The signals on lines 20 may include, for example, multiple background video input signals on lines 62, and video key signals on lines 64. In generally conventional configuration, the input matrix 12 in turn supplies background video signals via the A and B buses 21, 23 respectively, as well as a pair of key video signals K1 and K2 via a pair of key input buses 66, respectively. A further downstream (DSK) key signal is provided via a DSK key input bus 67 and functions in the manner of the K1, K2 key signals as described below. In conventional fashion, the input video and key sources are fed via the input video lines 62, 64 through the input matrix 12, whereby any source signal may be supplied to any of the matrix output buses 21, 23, 66 and 67, depending upon the desired mode of operation and which of the corresponding internal crosspoints in the input matrix are enabled. Conventionally, the crosspoints are one-way electronic switches that select a respective input or reentry signal for use as a background or key video signal. Since the input matrix configuration and function is well known in the switcher art, it is not further described herein.

In addition, the input video lines 62, 64 also are supplied to an auxiliary matrix 65 which corresponds to the auxiliary matrix 32 in the system of FIG. 1, which supplied the input signals to the digital effects unit 34. The auxiliary matrix 65 and its function in FIG. 3, is further described below.

The key source signals on buses 66 are supplied to the keyer 14 which, in turn, supplies K1 insert video and key signals on buses 26a, 28a, and K2 insert video and key signals on buses 26a, 28b, respectively. The key on bus 67 is used in the keyer to supply downstream (DSK) insert video and key signals on buses 26c, 28c, respectively.

As seen from the FIG. 3, the A Bus 21 and B Bus 23 are interruptible via respective crosspoints 68, 70. Likewise, the various insert video and key buses 26a, 28a, 26b, 28b, 26c and 28c are interruptible via respective crosspoints 72, 74, 76, 78, 80 and 82. As previously mentioned, the crosspoints are one-way electronic switches that in this arrangement may be selectively enabled or disabled to allow normal switcher operation, or added digital effects operation via the switching loop 50 and digital effects unit 52 when open and the respective buses are interrupted.

To this end, the A Bus 21, B Bus 23, and insert video buses 26a, 26b and 26c are coupled via respective connecting lines 83 and crosspoints 88 and 89 to dedicated digital effects video input buses 84, 86 (corresponding to the dedicated video input bus 54 of FIG. 2). The dedicated video input buses 84, 86 extend to digital effects video inputs in the digital effects unit 52 via amplifiers 85, 87. Likewise, the key signal buses 28a, 28b and 28c are coupled via respective connecting lines 81 and crosspoints 90 and 91 to dedicated digital effects key input buses 96, 98 (corresponding to the dedicated key input bus 56 of FIG. 2) via respective amplifiers 92, 94 and thence to the digital effects key inputs of unit 52. The amplifiers 92, 94, as well as the amplifiers 85, 87 are used to match the externally generated video signal levels with the switcher signal levels, whereby the switcher signals are made compatible with the signals from external apparatus. Thus, for example, amplifiers 85, 87 amplify the signals, while amplifiers 92, 94 attenuate the signals. As depicted, the input buses 84, 96 define a first digital effects input channel, while input buses 86, 98 define a second input channel, of the unit 52. An inverted A pattern signal is supplied via a connecting line 100 and an inverter 102 coupled to the dedicated key input buses 96, 98 of channels 1 and 2, via respective crosspoints 104 inserted prior to the amplifier circuits 92, 94. Such an A pattern input allows the digital effects unit to use the A pattern signal as a key to cut a hole in the video supplied therefrom.

Input video signals corresponding, for example, to the background video on A Bus and B Bus, are supplied via the auxiliary matrix 65, delays 106, 108 and amplifiers 110, 112 whose outputs are coupled to the dedicated digital effects input buses 84, 86 via respective crosspoints 114. A pair of auxiliary signals 1 and 2 conventionally are supplied on buses 116, 118 from amplifiers 110, 112 via crosspoints 120 and are used in external apparatus such as monitoring devices, which is not pertinent to this description. A preview (PVW) signal on a line 122 is coupled to the auxiliary signal buses 116, 118 via crosspoints 124 and provides means for selecting and monitoring the output signals from any bus or mixer via the auxiliary buses 116, 118, in generally conventional fashion.

In addition, a switcher input bus includes external lines 126, 128 for supplying selected external video signals to the dedicated input buses 84, 86 via crosspoints 130. Thus, the input video supplied to the digital effects unit 52 via the dedicated video input buses 84, 86 may comprise video signals from the auxiliary matrix 65, from the external sources on buses 126, 128, from the switcher internal video paths A Bus, B Bus or buses 26a, 26b, 26c, or from the mixer 16 output as described below, depending upon which of the corresponding crosspoints are enabled.

In turn, the digital effects unit 52 supplies digital effects output video signals and output key signals via dedicated digital effects video output buses 132, 134 and dedicated digital effects key output buses 136, 138, respectively. The dedicated video output bus 132 and dedicated video output bus 134 are coupled via respective connecting lines 133 back to the continuations of A Bus, B Bus and the insert video lines 26a, 26b and 26c via respective crosspoints 140, 142, 144, 146, 148, and 150, 152, 154, 156 and 158. The dedicated key output buses 136 and 138 are coupled via amplifier circuits 160, 162 and respective connecting lines 135 back to the key buses 28a, 28b, 28c via respective crosspoints 164, 166, 168 and 170, 172, 174. The continuations of the various video and key buses 21, 23, 26a, 26b, and 28a, 28b, are coupled to their respective inputs of the effects mixer 16.

The continuations of the buses 26c and 28c are coupled to the respective inputs of a downstream mixer 17. Digital graphics (DFX) insert and key inputs of the downstream mixer 17 are supplied with external graphics signals via lines 184, 186 and respective crosspoints 188, 190. In addition, the dedicated video output buses 132, 134 are connected to the DFX insert input of the downstream mixer via crosspoints 176, 178, and the dedicated key output buses 136, 138 and amplifiers 160, 162 are connected to the DFX key input via crosspoints 180, 182. Thus, the downstream mixer 17 may be supplied with video signals and key signals from the keyer 14, from the digital effects unit 52, or from an external graphics source. In addition, the downstream mixer 17 is supplied with program/preset (PGM/PST) video.

The DFX inputs on the downstream mixer 17 provide the feature of an external unity gain isolated key on a downstream mixer. This isolated key conventionally may be used for a character generator. In the present invention the isolated key may be used in conjunction with the dedicated key output buses 136, 138, for keying in the digital effects unit 52 output with its boundary signal. The location of this key below the downstream key and on top of the program/preset video, enables keying in an M/E output from the mixer 16, allowing wipes inside a shrunken raster. Digital wipes are possible if a dual channel digital effects unit 52 is used such as depicted in FIG. 3. Thus, the external isolated key is very useful for generating "over the shoulder" effects.

Conventionally, the pattern generator 18 provides a border signal and A and B pattern signals on the bus 24 of previous mention and shown here as respective lines 189, 191 and 192 coupled to the effects mixer 16 via respective crosspoints 194, 196 and 198. In addition, the output key signals on the dedicated key output buses 136, 138 from the digital effects unit 52 are coupled to the A and B pattern lines 191, 192 via a connecting line 199, crosspoints 200 and 202, and a matching amplifier 204. The latter connection allows the key signals from the digital effects unit 52 to be supplied to the effects mixer 16 in place of the A or B pattern signals from the pattern generator 18, to perform digital wipe effects.

The effects mixer 16 supplies a mix effects (M/E) signal on a connecting line 206, which is coupled back to an M/E input of the dedicated video input buses 84, 86 of the digital effects unit 52 via crosspoints 208, 210 respectively. The M/E signal also is fed to the downstream mixer 17, which supplies the output video signal from the switcher via an output line 212.

As may be seen, when the various (switchable) connecting lines are connected to the digital effects unit 52 and the respective crosspoints 68–82 are opened, the digital effects unit 52 effectively is inserted into the video and key paths of the switcher apparatus via the dedicated input/output buses, that is, the switching loop 50. The unit 52 supplies corresponding video and key signals to the effects mixer 16 and/or the downstream mixer 17, to provide selected digital effects additions to the switcher operation. To this end, the various crosspoints depicted herein are controlled in conventional fashion via digital control signals supplied thereto, which turn the crosspoints on or off. Thus, in FIG. 3 a control console computer unit (CPU) 214 monitors the faders, positioners and switches (not shown) of the switcher apparatus in conventional fashion. When a switch is pressed as when identifying a desired effect, or a fader or the positioner is moved to execute the desired effect, the CPU 214 encodes data identifying the change for that effect and sends it in serial form to an associated signal system CPU 216. The CPU 216 stores the data and sends the appropriate instructions to device control circuits 218 which supply the control signals as digital words to the respective matrix, mixer and keyer, as well to the switching loop 50 herein, via corresponding control buses 220. The control signals selectively control the crosspoints, including those crosspoints pertinent to the switching loop 50 and dedicated input/output buses, to execute the desired effect. The signal system CPU 216 responds to the control console, essentially echoing the data received. The control console provides corresponding indicator messages for the operator.

The digital effects made possible via the digital effects loop 50/unit 52 are assigned numbers in the manner of conventional analog effects generated by the switcher apparatus. Thus when an effect is desired and the corresponding switch is pushed, the effect is automatically encoded via the signal system CPU 216. In a desired key effect with added special effects such as movement, a menu may be supplied to provide interface with the operator.

Employing the configuration of FIGS. 2, 3 the inserted digital effects unit 52 can supply various digital effects which will be seen as modifications to the output signal supplied by the switcher. To illustrate by way of example only, various canned transitions, or wipe effects, now are available to an operator which will appear as digital wipe effects added to the switcher analog patterns or wipes. One example of an analog wipe is the effect of moving a vertical bar across a television raster from left to right to reveal a second video picture corresponding to the new bus video. The digital effects means 50/52 provides a digital version of the wipe by sliding the second picture over the raster while sliding the first picture away. A second example of an analog wipe starts with a small rectangle which grows until it completely reveals a new background video picture. The digital equivalent performed by the digital effects means 50/52 herein, includes a compressed video raster of the new background video expanding over the previous video picture until it becomes full size. In generating such digital wipe effects, an operator uses the same switcher controls as when selecting an analog wipe or pattern number with the corresponding A and B bus sources. The transition is performed using the wipe mode.

To illustrate, a wipe from B bus video to A Bus video is performed by supplying the A bus video via the connecting line 83 to, for example, the channel 1 dedicated video input bus 84 of the digital effects unit 52 by enabling the respective crosspoint 88 on bus 84. Two fields later, the unit 52 supplies the manipulated A bus signal on the dedicated digital effects video output bus 132 and connecting line 133, at which time the crosspoint 68 is opened while the crosspoint 140 is closed to supply the A bus video to the effects mixer 16. The digital effects unit 52 also supplies a digital effects output key signal to the A and B pattern inputs of the effects mixer 16 via the dedicated key output bus 136, crosspoint 200, connecting line 199, amplifier 204 and crosspoints 202. Pattern bus crosspoints 196, 198 are opened. Thus, the unit 52 generates a boundary signal that is used by the effects mixer 16 instead of the pattern control signals from the generator 18 to replace the existing B bus video with the A bus video. In an alternate mode of operation, channel 2 of the digital effects unit 52 may be used to slide the B bus video off the raster while replacing it with the A bus video. The B bus video is supplied to the dedicated video input bus 86 of channel 2 via a crosspoint 89, with the effects unit 52 supplying the B bus video to the effects mixer 16 via the dedicated video output bus 134 and crosspoint 152. Crosspoint 70 is opened. In either mode, the resulting digital wipe effect is supplied on the video output 212 via the downstream mixer 17.

The digital effects means 50/52 also may be employed to digitally process a key hole cutting signal along with the keyed video. This gives the effect of manipulating a key instead of the entire raster, and the digital effects unit 52 appears as a modifier to the key. Thus, given a video source, for example, on input K2 from the input matrix 12, a key source is selected by the keyer 14 and the corresponding K2 insert signal K2 key signal are derived on buses 26b, 28b, respectively. The K2 insert signal is fed to, for example, the channel 2 dedicated video input bus 86 of the digital effects unit 52 via the respective connecting line 83, crosspoint 89 and bus 86, while the K2 key signal is fed to the key input of unit 52 via the respective crosspoint 91, connecting line 81, amplifier 94 and dedicated bus 98. The digital effects unit 52 provides the digital effects output video and key signals to the effects mixer 16 two fields later in time, via the dedicated output buses 134, 138, connecting lines 133, 135 and crosspoints 156, 172 respectively. Crosspoints 76 and 78 are opened simultaneously with the closing of crosspoints 156, 172 to enable routing the video and key signals through the unit 52 via the switching loop 50. If the insert level is adjusted to the maximum level the entire raster is keyed in, and the switcher directs the digital effects unit 52 to ignore the key signal and instead generate its boundary signal. The digitally manipulated signals are mixed in the effects mixer 16, whereby colored borders, soft transitions, etc., are provided with the keys entire raster. The resulting effect is supplied on output 212 via the downstream mixer 17.

What is claimed is:

1. A system for generating digital effects via a video switcher having a video source for supplying video source signals, a keyer coupled to the video source for supplying insert video and key signals, a pattern generator for supplying a pattern signal, and a mixer for providing an output video signal and having inputs coupled to the video source, the keyer and the pattern generator, comprising:

digital effects generating means operatively inserted between the video source and said mixer, and between the keyer and the mixer, for receiving a selected signal of the signals supplied within the switcher by the video source and the keyer and for supplying a selected manipulated digital effects output output signal; and control means integral with the switcher and coupled to the digital effects generating means for selectively re-routing the selected signal to the digital effects generating means and then re-routing the selected manipulated digital effects output signal back to the inputs of the mixer.

2. The system of claim 1 wherein the digital effects generating means includes:

a digital effects loop inserted between the video source and said mixer and between the keyer and said mixer; and a digital effects unit operatively coupled to the digital effects loop in response to the control means.

3. The system of claim 2 wherein the video source, the insert video and the key signals are supplied to said digital effects loop on respective buses, and wherein the digital effects loop includes:

switch means inserted in the respective buses for selectively interrupting a bus to re-route the respective signal through the digital effects unit in response to the control means.

4. The system of claim 3 wherein the digital effects loop includes:

switchable connector lines coupled from the respective buses to the digital effects unit input at a point on the bus prior to the switch means, and from the digital effects unit output back to the respective buses at a point thereof after the switch means, for inserting the digital effects unit into the selected bus or buses by enabling respective switchable connector lines in response to the control means.

5. The system of claim 4 wherein the switch means and the switchable connecting lines include crosspoints responsive to the control means.

6. The system of claim 4 wherein the digital effects loop further includes:

dedicated digital effects video and key input buses;
dedicated digital effects video and key output buses; and said switchable connector lines being coupled to a selected one of said dedicated video and key input and output buses.

7. The system of claim 6 for generating a digital wipe effect via the switcher and further including:

a first switchable connector line for coupling one of said video source signals to the dedicated digital effects video input bus;

a second switchable connector line for coupling the selected manipulated digital effects output signal from the digital effects unit back to the mixer to replace said one video source signal;

said switch means being disposed to interrupt passage of the video source signal directly to the mixer; and a third switchable connector line for supplying a resulting key signal from the dedicated digital effects key output bus to the mixer for use by the mixer in place of the pattern signal.

8. The system of claim 6 for generating a digital key effect via the switcher, further including:

a first switchable connector line for coupling one of said insert video signals to the dedicated digital effects video input bus;

a second switchable connector line for coupling one of said key signals to the dedicated digital effects key input bus;

a third switchable connector line for coupling the selected manipulated digital effects video output signal from the digital effects unit back to the mixer to replace said one insert video signal thereto;

a fourth switchable connector for coupling the selected manipulated digital effects key output signal from the digital effects unit back to the mixer to replace said one key signal thereto; and said switch means being disposed to interrupt passage of the one insert video signal and the one key signal directly to the mixer.

9. A system for generating digital effects via a video switcher having a signal source, a keyer, and a mixer, and including video source signal buses extending between the video source and the mixer, and video and key buses extending between the keyer and the mixer, comprising:

a digital effects loop inserted within the video source signal buses and the video and key signal buses which extend to the mixer; and a digital effects unit selectively coupled to at least one of the signal buses via the digital effects loop, for supplying a digital effects video output signal back to the at least one signal bus extending to the mixer, and for supplying an associated digital effects key output signal to the mixer.

10. The system of claim 9 wherein the digital effects loop includes:

crosspoint means inserted in the video source signal buses and the video and key signal buses for selectively interrupting selected buses to the mixer to re-route said selected buses through the digital effects unit.

11. The system of claim 10 including:

control means coupled to the crosspoint means for selectively switching the crosspoint means in response to a desired digital effect.

12. The system of claim 10 wherein:

said crosspoint means are disposed to interrupt the selected video source signal bus, and the selected video and key signal buses, at respective points thereof which lie between where the respective buses are to be re-routed to and from the digital effects unit.

13. The system of claim 10 including:

an input connecting line coupled to an input of the digital effects unit from the video source signal bus which extends to the mixer;

a first output connecting line coupled from a respective video output of the digital effects unit back to the same video source signal bus which extends to the mixer;

pattern generating means including crosspoint means for supplying a pattern signal to the mixer;

a second output connecting line coupled from a respective key output of the digital effects unit to the crosspoint means of the pattern generating means to replace the use of the pattern signal in the mixer; and said crosspoint means in the video source signal bus interrupts the video source signal bus at a point thereof between the input and first output connecting lines.

14. The system of claim 10 wherein the digital effects loop further includes:

dedicated digital effects video and key input buses integral with the digital effects unit; and dedicated digital effects video and key output buses integral with the digital effects unit.

15. The system of claim 14 wherein the digital effects loop further includes:

input connecting lines switchably coupled from the video source signal and the video and key signal buses to selected dedicated digital effects video and key input buses of the digital effects unit; and output connecting lines switchably coupled from the respective dedicated digital effects video and key output buses of the digital effects unit back to the corresponding video source and video and key signal buses which extend to the mixer.

16. The system of claim 14 wherein the video switcher includes a pattern generator for supplying a pattern signal to the mixer, the system further including:

a switchable connecting line for switchably coupling the dedicated digital effects key output bus to the mixer to replace the pattern signal from the pattern generator.

17. A system for generating digital effects via a switcher having a mixer for combining signals, a keyer for supplying an insert video signal and a key signal to the mixer via respective insert video and key buses, and a switching matrix for selectively supplying video source signals to the mixer and the keyer via respective video source buses, comprising:

a digital effects unit having digital effects video and key signal inputs and outputs;

digital effects input loop means including switchable connecting lines for selectively coupling the video source buses and the keyer insert video bus to the digital effects video signal input, and for selectively coupling the keyer key signal bus to the digital effects key signal input;

digital effects output loop means including switchable connecting lines for selectively coupling the digital effects video signal output back to the same video source buses and insert video buses that are switched to the digital effects video signal input of the digital effect unit, and for selectively coupling the digital effects key signal output back to the same key signal bus that is switched to the digital effects key signal input of the digital effects unit; and means inserted in the video source, the insert video and the key signal buses at a point thereof between where the input and output loop means are coupled, for selectively interrupting the buses which are switched to the digital effects unit.

18. The system of claim 17 including:

control means coupled to the switchable connecting lines and to the interrupting means for selectively switching same to re-route at least one of the signals through the digital effects unit commensurate with a desired digital effect.

19. The system of claim 17 including:

dedicated digital effects video and key input buses integral respectively with said digital effects video and key inputs;

dedicated digital effects video and key output buses integral with said respective digital effects video and key outputs;

said input and output loop means connecting lines being switchably coupled to the respective dedicated video and key input and output buses; and wherein the dedicated input and output buses, and switchable connecting lines and the interrupting means comprise a digital effects switching loop.

20. The system of claim 19 for generating a digital wipe effect via the switcher which further has a pattern generator for supplying a pattern signal via a pattern bus, including:

a first switchable connecting line coupled from the video source bus to the dedicated digital effects video input bus;

a second switchable connecting line coupled from the dedicated digital effects video output bus back to the same video source bus that is coupled to the first switchable connecting line;

a third switchable connecting line coupled from the dedicated digital effects key output bus back to the mixer to replace the pattern signal from the pattern generator; and said interrupting means being disposed to interrupt the video source bus at a point thereof between the connections of the first and second switchable connecting lines.

21. The system of claim 20 wherein the third switchable connecting line is coupled back to the pattern bus.

22. The system of claim 20 wherein the third switchable connecting line is coupled back to the key bus which extends to the mixer, and the interrupting means is disposed to interrupt the key bus prior thereto.

23. The system of claim 19 for generating a digital key effect via the switcher which further has a pattern generator for supplying a pattern signal, including:

a first switchable connecting line coupled from the insert video bus to the dedicated digital effects video input bus;

a second switchable connecting line coupled from the key bus to the dedicated digital effects key input bus;

a third switchable connecting line coupled from the dedicated digital effects video output bus back to the same insert video bus that is coupled to the first switchable connecting line;

a fourth switchable connecting line coupled from the dedicated digital effects key output bus back to the same key bus that is coupled to the second switchable connecting line; and said interrupting means being disposed to interrupt the insert video bus and the key bus at a point thereof between the connections of the first and third, and second and fourth, switchable connecting lines respectively.

24. A method for adding digital effects to effects generated by a video switcher, comprising:
supplying select video source, insert video and key signals;
interrupting at least one of the select video, insert video and key signals;
re-routing the at least one interrupted signal;
generating manipulated digital effects video and key output signals from the at least one re-routed signal; and
selectively returning the manipulated digital effects video and key output signals to replace said at least one original interrupted select signal.

25. The method of claim 24 wherein;
the step of interrupting includes opening an electronic switch in the path of the at least one interrupted signal; and
the step of re-routing includes closing electronic switches located prior to, and after, the opened electronic switch, and supplying the at least one re-routed signal to and from a digital effects generating means.

26. The method of claim 25 wherein;
the step of generating includes selectively manipulating the at least one re-routed signal in accordance with the digital effect which is to be added to the effect generated by the video switcher;
the step of selectively returning includes supplying the manipulated digital effects video output signal back to the path of the at least one interrupted signal via the closed electronic switch located after the opened electronic switch; and
mixing the manipulated digital effects video and key output signals in accordance with the manipulated digital effects key output signal.

27. A method for combining desired digital effects with effects generated by a video switcher, comprising:
supplying selected video source signals, insert video signals and key video signals internally within the switcher;
re-routing at least one of the video signals within the switcher to provide a video input signal to a digital effects generating means;
supplying a digitally transformed video output signal from the digital effects generating means commensurate with the desired digital effect;
supplying an associated digitally transformed key signal from the digital effects generating means commensurate with the desired digital effect;
applying the digitally transformed video output signal in place of the at least one video signal; and
combining the digitally transformed video output signal and the associated digitally transformed key signal in a combination determined by the latter key signal.

* * * * *

UNITED STATES PATENT AND TRADEMARK OFFICE
CERTIFICATE OF CORRECTION

PATENT NO. : 4,694,344

DATED : September 15, 1987

INVENTOR(S) : Jay L. Flora

It is certified that error appears in the above-identified patent and that said Letters Patent is hereby corrected as shown below:

Column 3, line 31, after "supplies" insert --insert--;
Column 9, line 26, delete "output" (first occurrence);
Column 10, line 28, after "connector" insert --line--;
Abstract, line 9, delete "then" insert --thence--.

Signed and Sealed this

Fifteenth Day of March, 1988

Attest:

DONALD J. QUIGG

*Attesting Officer*  *Commissioner of Patents and Trademarks*